April 2, 1968     B. L. WILKINSON     3,376,494
HIGH FREQUENCY CONTROLLED RECTIFIER CIRCUIT
Filed May 20, 1965
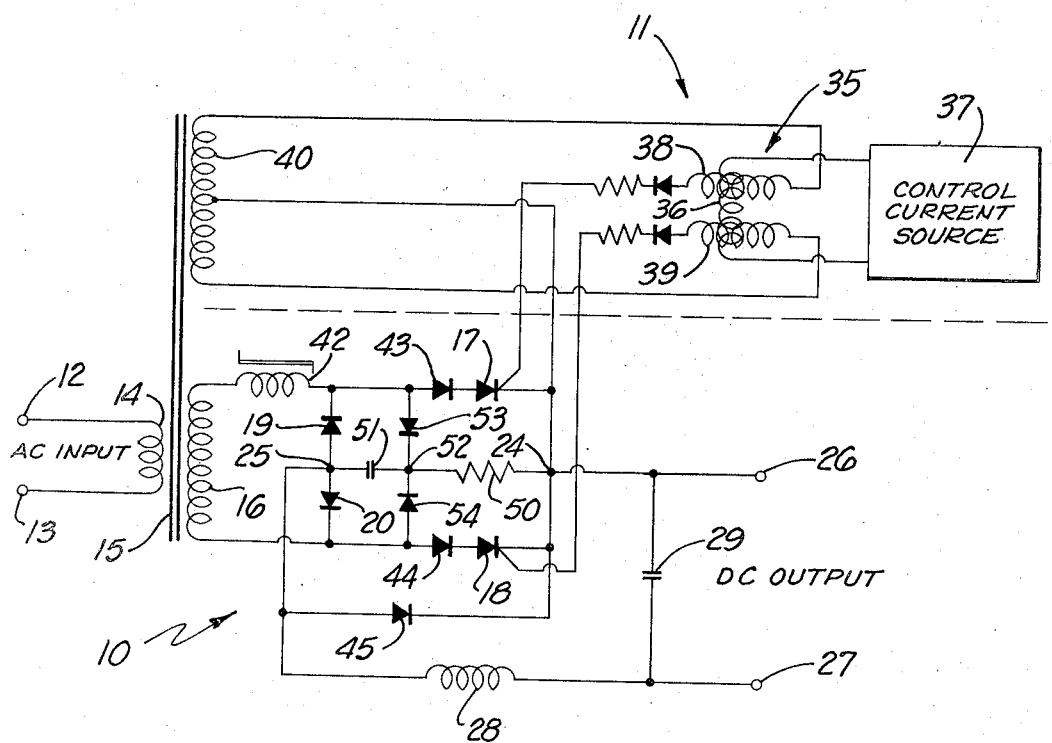
INVENTOR.
BRUCE L. WILKINSON
BY HIS ATTORNEYS
HARRIS, KIECH, RUSSELL & KERN United States Patent Office 3,376,494
Patented Apr. 2, 1968

3,376,494
HIGH FREQUENCY CONTROLLED RECTIFIER CIRCUIT
Bruce L. Wilkinson, Torrance, Calif., assignor to Power Conversion, Inc., Long Beach, Calif., a corporation of California
Filed May 20, 1965, Ser. No. 457,360
4 Claims. (Cl. 321—45)

ABSTRACT OF THE DISCLOSURE

A rectifier circuit using SCR's for operation at 50 kilocycles per second and including a diode in series with and of the same polarity as an SCR for limiting reverse current, a saturable reactor in the A.C. input for delaying input current following polarity reversal, a diode in parallel with the output and of opposite polarity for increasing the time for turn-off, and a transient suppression circuit.

---

This invention relates to rectifier circuits and, in particular, to controlled rectifier circuits using solid state rectifiers and operable at high freqeuncies, typically in the order of 50 kilocycles per second and higher.

Silicon controlled rectifiers, often referred to as SCR's, are widely used in rectifier circuits to provide a D.C. output voltage which can be regulated or varied to desired values. A controlled rectifier is a three-element device having an anode, a cathode and a control element. The rectifier is in the conducting condition when a voltage of one polarity, a forward voltage, is applied across the anode and cathode, and is in the nonconducting or blocking condition when a voltage of the opposite polarity, a reverse voltage, is applied across the anode and cathode. When in the conducting condition with a forward voltage thereacross, the rectifier can be fired or triggered into conduction by application of a suitable voltage to the control element. In a typical rectifier circuit, two of the controlled rectifiers are connected to an A.C. input for full wave operation to provide a D.C. output. The magnitude of the D.C. output is a function of the on time or conduction time of the rectifiers. The rectifier is fired into conduction during the conducting period by a control circuit. The control circuit may be utilized to vary the D.C. output via a manual or externally driven adjustment and may be utilized to maintain the D.C. output constant utilizing a negative feedback circuit from the D.C. output to the control circuit. These controlled rectifier circuits are in general use and the present application is directed to new and novel features which provide substantial improvement in the operation of these circuits.

Presently available SCR's will not function in conventional rectifier circuits at higher frequencies, such as in the range of 5 to 50 kilocycles per second. In the conventional circuitry, the SCR is destroyed by the heat resulting from power dissipation during the switching operation, even when operating at no load. It is an object of the present invention to provide a new and improved rectifier circuit which may be operated with SCR's at frequencies far higher than those previously useable.

In high frequency rectifier circuits, large voltage transients appear during the switching periods. For reliable operation of the rectifiers, it has been necessary in conventional circuits to drastically derate the forward voltage ratings of the rectifiers which results in a severe limitation on the power handling capability of the rectifier. It is an object of the present invention to provide a new and improved rectifier circuit operable at high frequencies and one which substantially eliminates problems due to voltage transients.

It is an object of the invention to provide in a controlled rectifier circuit having an A.C. input connected to a pair of controlled rectifiers and a control circuit for turning the rectifiers on to produce a D.C. output, the improvement comprising a pair of diodes, with a diode connected in series with each controlled rectifier with the serially connected diode and controlled rectifier polarized in the same direction. A further object is to provide in a controlled rectifier circuit a delay means connected in the A.C. input for delaying application of input current of one polarity for a period of time after the opposite polarity input was dropped to substantially zero. An additional object is to provide in a controlled rectifier circuit another diode connected across the D.C. output between the controlled rectifiers and the output filter with a polarity opposite to that of the D.C. output.

It is an additional object of the invention to provide in such a controlled rectifier circuit a transient suppression circuit comprising a resistance and a capacitance connected in series at a junction point across the D.C. output of the controlled rectifiers, and a pair of diodes with each diode connected between a side of the A.C. input and the junction point for charging the capacitance through the diode.

The invention also comprises novel combinations and arrangements of parts which will more fully appear in the course of the following description. The drawing shows a preferred form of a controlled rectifier circuit incorporating the present invention and is given by way of illustration or example.

In the schematic of the drawing, the controlled rectifier circuit is indicated generally at 10 and the control circuit for turning the rectifiers on is indicated generally at 11. The A.C. input is applied at terminals 12, 13 of a primary winding 14 of a transformer 15. The secondary winding 16 is connected across a bridge circuit comprising SCR's 17, 18 and diodes 19, 20. The D.C. output from the rectifiers appears at points 24, 25 and is connected to D.C. output terminals 26, 27 via an inductance 28 and a capacitor 29 which provides filtering for the rectified output.

The output of the control circuit 11 is connected to the control elements of the SCR's 17, 18. The control circuit 11 is typical of conventional circuits presently in use and may incorporate a magnetic amplifier 35 having a control winding 36 energized from a current source 37. The output windings 38, 39 of the magnetic amplifier are energized from a winding 40 on the transformer 15, with each output winding coupled through a diode and a current limiting resistor to the corresponding SCR control element. A variation in the output of the current source 37 will change the firing time of the SCR's, with the two controlled rectifiers being fired out of phase to control the magnitude of the D.C. output.

A saturable reactor 42 is connected in the A.C input circuit. A diode 43 is connected in series with the SCR 17 and another diode 44 is similarly connected in series with the SCR 18. The diodes 43, 44 are polarized in the same direction as the corresponding SCR's. A diode 45 is connected across the points 24, 25 with a polarity opposite to that of the D.C. output.

A resistor 50 and a capacitor 51 are connected in series at a junction point 52 between the points 24, 25. A diode 53 is connected from one side of the A.C. input to the junction point 52 and another diode 54 is similary connected from the other side of the A.C. input to the junction point 52.

The SCR's 17, 18 and the diodes 19, 20 function as a full wave bridge rectifier to convert the A.C. input at terminals 12, 13 to a D.C. output at terminals 26, 27, with the control circuit 11 functioning to control the on or conduction time of each SCR. The saturable reactor 42 functions to prevent current buildup from the A.C. input through the SCR for a short period of time after the SCR is turned on. Typically this delay is about two microseconds. This delay is desirable in that it prevents current flow in an SCR until the SCR is switched fully on.

The diode 43 connected in series with the SCR 17 functions to limit the reverse current in the SCR to a very small value and thereby limit the power dissipation during switching to a very small value. When the reverse voltage is applied to an SCR which has been conducting, normally there is a reverse current for an appreciable period of time as carriers are withdrawn from the SCR. This reverse current produces a substantial amount of heating in the SCR, particularly at high switching rates. The recovery time of the diode 43 on switching rates. The recovery time of the diode 43 on application of reverse voltage is much faster than that of the SCR. Therefore, when reverse voltage is applied across the diode and SCR, the diode blocks reverse current very quickly with a resultant substantial reduction in commutating or switching losses. The diode 44 functions in the same manner in conjunction with the SCR 18.

The diode 45 provides an increase in the time available for turnoff of an SCR by serving as a path for current from the inductance 28 during the period when both SCR's are off. In the conventional circuit, the available turnoff time for the SCR is one half cycle less the turnon delay time. With the utilization of the diode 45, the available turnon time is increased to a full half cycle. The total turnon delay time referred to here is the delay produced by the saturable reactor 42 plus the delay produced by the control circuit 11.

Large voltage transients are often produced in the rectifier circuits during the switching period, primarily due to energy stored in stray inductances of leads and transformers and inductors. These switching transients are particularly troublesome at high frequencies. The high transient voltages adversely affect the control of the controlled rectifiers and often require reduction of forward voltage ratings in order to obtain reliable operation. The resistor 50, capacitor 51 and diodes 53, 54 provide a transient suppression circuit which effectively clips or limits voltage transients to a value slightly greater than the peak value of the A.C. input.

The capacitor 51 is normally charged through the resistor 50 and the magnitude of the resistor 50 is selected to provide a voltage on the capacitor slightly above the peak value of the A.C. input developed across the SCR. Then when a voltage transient appears which is greater in value than this charge on the capacitor, the diode 53 or 54 will conduct so that the voltage transient is absorbed in the capacitor rather than being developed across the SCR. The additional charge on the capacitor will be dissipated through the resistor 50 during the remainder of the half cycle. With this circuit arrangement, the peak voltage from any transient will be limited to the clamp voltage which is the normal charge voltage on the capacitor 51.

The circuit of the application permits operation of SCR's in controlled rectifier circuits at frequencies in the range of 5 to 50 kilocycles per second and higher. For example, a rectifier circuit utilizing two SSPI Type 3A1241 SCR's at 20 kilocycles per second input frequency is operated to provide 1.0 ampere at 300 volts D.C. on a continuous basis.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a controlled rectifier circuit having an A.C. input connected to a pair of controlled rectifiers and a control circuit for turning the rectifiers on to produce a D.C. output, the improvement comprising in combination:
   a pair of first diodes, each of said first diodes connected in series with each controlled rectifier with the serially connected first diode and controlled rectifier polarized in the same direction; and
   a transient suppression circuit comprising a resistance and a capacitance connected in series at a junction point across the D.C. output of said controlled rectifiers, and a pair of second diodes, with each second diode connected between a side of the A.C. input and said junction point for charging said capacitance through such diode.

2. A circuit as defined in claim 1 including an inductance-capacitance output filter and a second diode connected across the D.C. output between said control rectifiers and said filter with a polarity opposite to that of the D.C. output.

3. A circuit as defined in claim 1 including delay means connected in the A.C. input for delaying input current build-up for a period of time after a controlled rectifier is turned on.

4. In a controlled rectifier circuit having an A.C. input connected to a pair of controlled rectifiers and a control circuit for turning the rectifiers on to produce a D.C. output at an inductance-capacitance filter, the improvement comprising in combination:
   a pair of first diodes, each of said first diodes connected in series with each controlled rectifier with the serially connected first diode and controlled rectifier polarized in the same direction;
   delay means connected in the A.C. input for delaying input current buildup for a period of time after a controlled rectifier is turned on;
   a second diode connected across the D.C. output between said controlled rectifiers and said filter with a polarity opposite to that of the D.C. output; and
   a transient suppression circuit comprising a resistance and a capacitance connected in series at a junction point across the D.C. output of said controlled rectifiers, and a pair of third diodes, with each third diode connected between a side of the A.C. input and said junction point for charging said capacitance through such diode.

References Cited

UNITED STATES PATENTS

| | | | |
|---|---|---|---|
| 3,211,985 | 10/1965 | Torok | 321—47 X |
| 3,213,351 | 10/1965 | Walker | 321—47 X |
| 3,221,241 | 11/1965 | Greenberg et al. | 321—47 |
| 3,277,360 | 10/1966 | Carmichael | 321—43 X |
| 3,281,645 | 10/1966 | Spink | 321—47 |
| 3,299,341 | 1/1967 | Corey | 321—47 |
| 3,300,706 | 1/1967 | Wellford | 321—43 |

JOHN F. COUCH, *Primary Examiner.*

W. M. SHOOP, *Assistant Examiner.*